United States Patent
Chauvet et al.

(10) Patent No.: US 10,042,694 B2
(45) Date of Patent: Aug. 7, 2018

(54) CONTROL BLOCK VALIDATOR

(71) Applicant: International Business Machines Corporation, Armonk, NY (US)

(72) Inventors: Philip R. Chauvet, Tucson, AZ (US); Franklin E. McCune, Tucson, AZ (US); David C. Reed, Tucson, AZ (US); Esteban Rios, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 15/257,347

(22) Filed: Sep. 6, 2016

(65) Prior Publication Data

US 2018/0067791 A1    Mar. 8, 2018

(51) Int. Cl.
*G06F 11/00*    (2006.01)
*G06F 11/07*    (2006.01)
*G06F 3/06*    (2006.01)

(52) U.S. Cl.
CPC .......... *G06F 11/079* (2013.01); *G06F 3/0619* (2013.01); *G06F 3/0653* (2013.01); *G06F 3/0683* (2013.01); *G06F 11/0727* (2013.01); *G06F 11/0751* (2013.01); *G06F 11/0772* (2013.01)

(58) Field of Classification Search
CPC ....... G06F 11/08–11/3668; G06F 21/50–21/54
See application file for complete search history.

(56) References Cited

U.S. PATENT DOCUMENTS

| | | | |
|---|---|---|---|
| 5,717,849 A | 2/1998 | Brady | |
| 7,752,497 B2 | 7/2010 | Buttlar et al. | |
| 8,141,086 B2 | 3/2012 | Cocks et al. | |
| 2007/0150709 A1* | 6/2007 | Easton | G06F 11/008 712/224 |
| 2012/0102454 A1* | 4/2012 | Burghard | G06F 8/43 717/110 |

OTHER PUBLICATIONS

Byrne, et al., "Address/Identifier Control Block Structure and Validity Checking Mechanism," ip.com, No. IPCOM000080575D, Jan. 1, 1974.

\* cited by examiner

*Primary Examiner* — Michael Maskulinski
(74) *Attorney, Agent, or Firm* — Nelson & Nelson; Daniel P. Nelson; Alexis V. Nelson (57) ABSTRACT

A method for validating control blocks in memory includes monitoring for operations configured to obtain storage space in memory. The method examines the storage space that has been obtained to identify control blocks stored in the storage space. These control blocks are then analyzed to determine whether the control blocks are valid. In certain embodiments, this may be accomplished by comparing the content of the control blocks to information in a validation table that indicates possible values and ranges of values for fields in the control blocks. If a control block is valid, the method records a date and time when the control block was validated. If a control block is not valid, the method generates a message indicating that the control block is not valid. A corresponding system and computer program product are also disclosed.

20 Claims, 5 Drawing Sheets

CONTROL BLOCK VALIDATOR

BACKGROUND

Field of the Invention

This invention relates to systems and methods for validating control blocks in memory.

Background of the Invention

Control blocks are widely used by the z/OS operating system to manage the work and resources of the system on which z/OS is executing. Control blocks may be defined as segments of storage designated for a particular operating system component that provide specific data about an artifact within the z/OS environment. These control blocks contain fields and offsets (displacements) that are used by the operating system during its processing. Control blocks are represented internally as real, virtual, and hard storage areas containing specific information pertaining to events, activity, and status occurring within the operating system. In many cases, control blocks may reference one another and/or be chained together to span various areas of an operating system's internal structure. Knowledge of these control blocks may be useful to determine vital information about the system and its status when a component fails. In particular, control blocks may provide debugging functionality in the event an operating system component or user application fails while the system is running.

Large numbers of control blocks may be created in memory depending on program activity and the type of control block. The size and purpose of these control blocks may vary significantly. Some are small, others are very large, but most are critically important to proper system and program operations. Unfortunately, control blocks may be damaged by defects or errors such as storage overlays, program errors, and the like. When data in these control blocks is damaged, it can lead to a wide variety of random errors including abnormal terminations (i.e., ABENDs), hangs, data integrity issues, and in some cases system outages required to clear out invalid data in a control block. If invalid data within a control block could be detected sooner, its impact could possibly be minimized or reduced.

In view of the foregoing, what are needed are systems and methods to detect errors/defects in control blocks. Ideally, such errors/defects could be detected before they cause significant negative impacts.

SUMMARY

The invention has been developed in response to the present state of the art and, in particular, in response to the problems and needs in the art that have not yet been fully solved by currently available systems and methods. Accordingly, systems and methods are disclosed for validating control blocks in memory. The features and advantages of the invention will become more fully apparent from the following description and appended claims, or may be learned by practice of the invention as set forth hereinafter.

Consistent with the foregoing, a method for validating control blocks in memory is disclosed. In one embodiment, such a method includes monitoring for operations configured to obtain storage space in memory. The method examines the storage space that has been obtained to identify control blocks stored in the storage space. These control blocks are then analyzed to determine whether the control blocks are valid. In certain embodiments, this may be accomplished by comparing the content of the control blocks to information in a validation table that indicates possible values and ranges of values for fields in the control blocks. If a control block is valid, the method records a date and time when the control block was validated. If a control block is not valid, the method generates a message indicating that the control block is not valid.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 1:
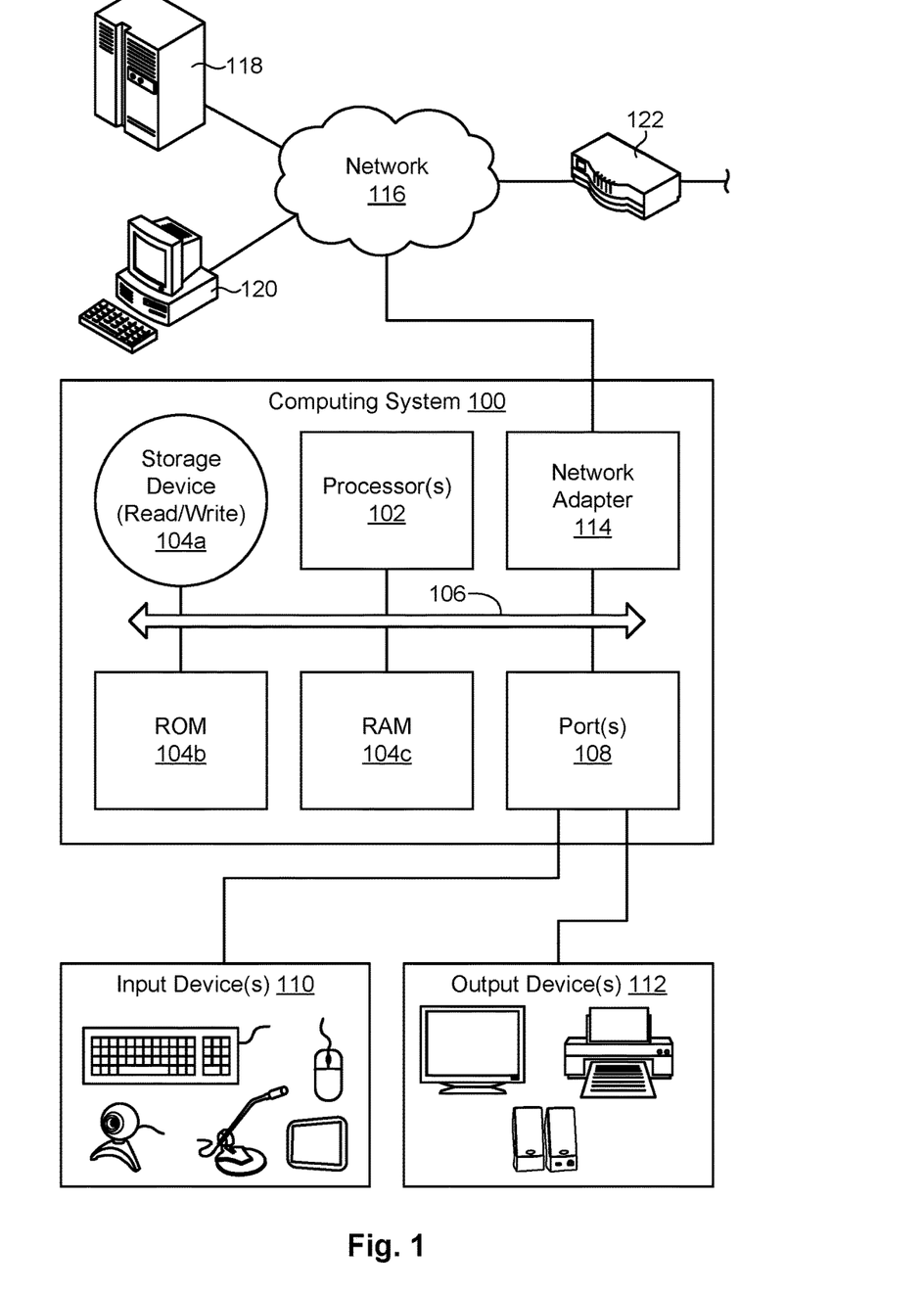
FIG. 1 is a high-level block diagram showing one example of a computing system in which a system and method in accordance with the invention may be implemented.

Referring to FIG. 1, one example of a computing system 100 is illustrated. The computing system 100 is presented to show one example of an environment where a system and method in accordance with the invention may be implemented. The computing system 100 may be embodied as a mobile device 100 such as a smart phone or tablet, a desktop computer, a workstation, a server, or the like. The computing system 100 is presented by way of example and is not intended to be limiting. Indeed, the systems and methods disclosed herein may be applicable to a wide variety of different computing systems in addition to the computing system 100 shown. The systems and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a wired or wireless network adapter 114 to connect the computing system 100 to a network 116, such as a LAN, WAN, or the Internet. Such a network 116 may enable the computing system 100 to connect to one or more servers 118, workstations 120, personal computers 120, mobile computing devices, or other devices. The network 116 may also enable the computing system 100 to connect to another network by way of a router 122 or other device 122. Such a router 122 may allow the computing system 100 to communicate with servers, workstations, personal computers, or other devices located on different networks.

Figure 2:
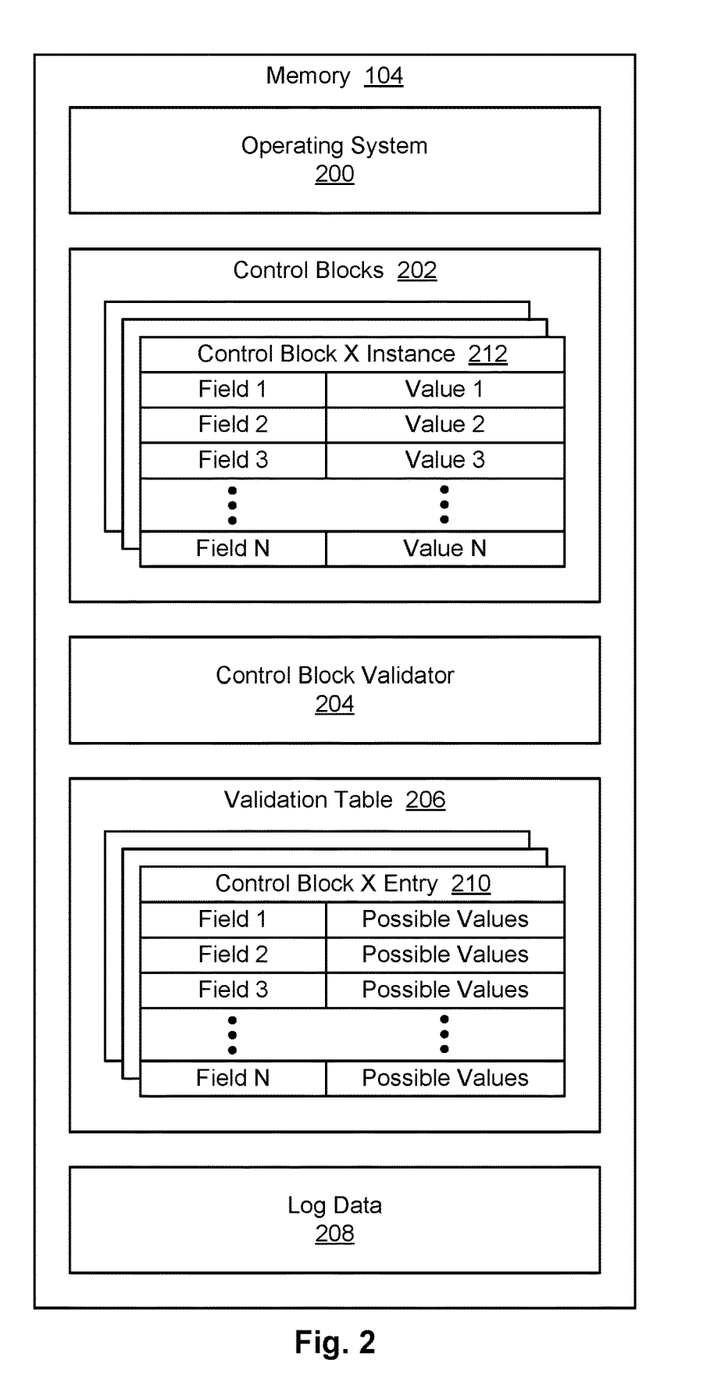
FIG. 2 is a high-level block diagram showing various modules and data structures that may be included in memory of the computing system of FIG. 1.

Referring to FIG. 2, as previously discussed, control blocks 202 are widely used by operating systems 200 such as the z/OS operating system to manage the work and resources of a computing system 100 on which operating system 200 is executing. Control blocks 202 may be defined as segments of storage designated for a particular operating system component that provide specific data about an artifact within the operating system environment. These control blocks usually contain fields that are used by the operating system 200 during its processing. As will be explained in more detail in association with FIG. 4, control blocks 202 may reference one another and/or be chained together to span various areas of an operating system's internal structure. Knowledge of these control blocks 202 may be useful to determine vital information about the computing system 100 and its status when a component fails. In particular, control blocks 202 may provide debugging functionality in the event an operating system component or user application fails while the computing system 100 is running.

Large numbers of control blocks 202 may be created in memory 104 depending on program activity and the type of control block 202. The size and purpose of these control blocks 202 may vary significantly. They may be small or very large, but most control blocks 202 are critically important to proper system and program operations. Unfortunately, control blocks 202 may be damaged by defects or errors such as storage overlays, program errors, and the like. When data in these control blocks 202 is damaged or invalid, it can lead to a wide variety of random errors including abnormal terminations (i.e., ABENDs), hangs, data integrity issues, and in some cases system outages required to clear out invalid data in a control block 202. If invalid data within a control block 202 could be detected sooner, its impact could potentially be minimized or reduced.

In order to detect errors/defects in control blocks 202 before they cause significant negative impacts or problems, a control block validator 204 may be provided. This control block validator 204 may periodically scan the memory 104 of the computing system 100 for control blocks 202 and analyze the control blocks 202 for errors or defects. If an error or defect is detected, the control block validator 204 may notify appropriate systems and/or personnel so that remedial actions may be taken. The control block validator 204 may also store log data 208 that documents when control blocks 202 were validated and/or found to contain errors or defects. This log data 208 may be helpful when determining how and when a control block 202 became defective.

When validating control blocks 202, the control block validator 204 may compare control blocks 202 to entries 210 in a validation table 206. Each entry 210 may be associated with a particular type of control block 202 and contain criteria for determining whether the control block 202 is valid. For example, the entry 210 may indicate fields that should be contained in a valid control block 202 as well as possible values and/or ranges of values for the fields. In general, the control block validator 204 may compare control block instances 212 in memory 104 to the entries 210 to determine if the control blocks 202 appear to be valid or if they appear to contain an error or defect. The control block validator 204 and various sub-modules within the control block validator 204 will discussed in more detail in association with FIG. 3.

Figure 3:
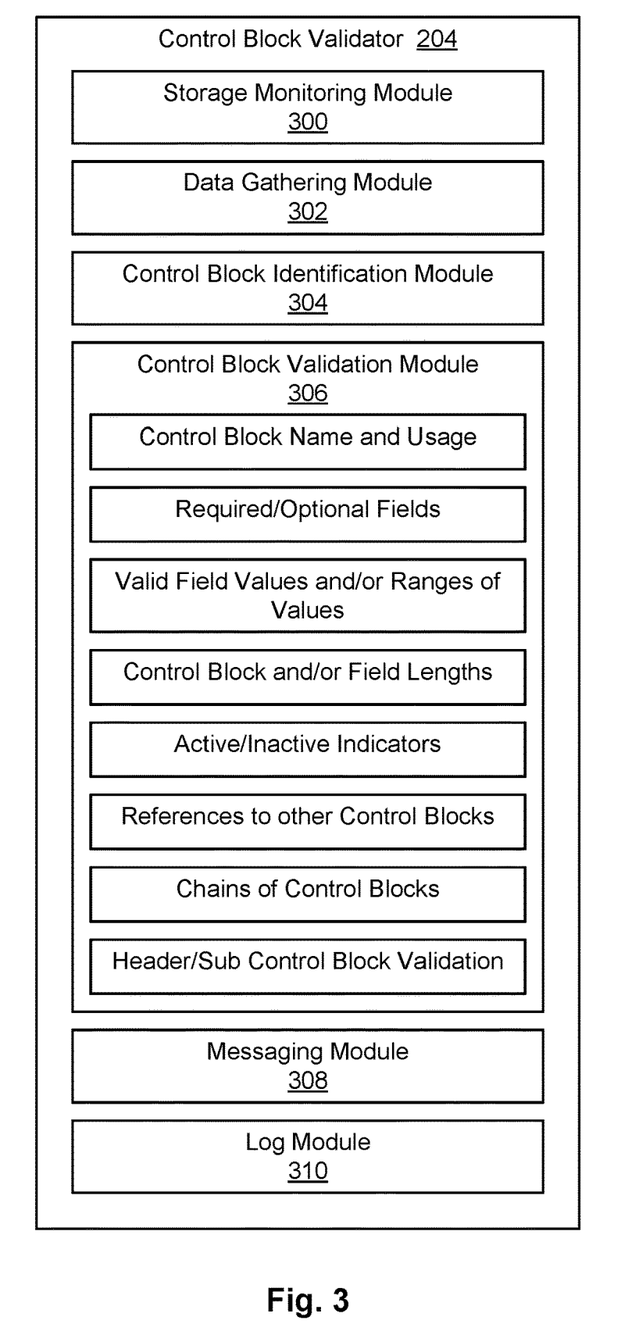
FIG. 3 is a high-level block diagram showing various sub-modules that may be included in a control block validator in accordance with the invention.

Referring to FIG. 3, as shown, the control block validator 204 may include various sub-modules to provide various features and functions. These sub-modules may include one or more of a storage monitoring module 300, data gathering module 302, control block identification module 304, control block validation module 306, messaging module 308, and log module 310. These sub-modules are presented by way of example and are not intended to represent an exhaustive list of sub-modules that may be included within the control block validator 204. The control block validator 204 may include more or fewer sub-modules than those illustrated, or the functionality of the sub-modules may be organized differently.

The storage monitoring module 300 may be configured to monitor when storage is obtained and released from memory 104. Products which obtain storage for control blocks 202 may obtain the storage in certain program locations. These locations may be monitored by the storage monitoring module 300 during system GETMAIN activities. When storage is obtained, the data gathering module 302 may gather information about the storage, such as the size of the storage, the location of the storage, which software module (such as a CSECT or other movable section of program code) obtained or released the storage, date and time the storage was obtained or released, as well any special characteristics of the storage that was obtained or released, such as whether the storage is common or private, the storage sub-pool in which the storage resides, the storage key, the storage address space and task control block (TCB) within the address space that is requesting the storage. The data gathering module 302 may store this information so that it can be used, if needed, by other sub-modules in the control block validator 204. When storage is released from memory 104, the storage monitoring module 300 may delete the information gathered by the data gathering module 302. In certain embodiments, the storage monitoring module 300 and data gathering module 302 may operate continuously in the background to monitor when storage is obtained and released.

The control block identification module 304 and control block validation module 306 may operate periodically, such as at selected intervals, or on an as-need-basis to analyze and validate control blocks 202 residing in memory 104 or in a subset of memory 104 (such as in a particular address space or storage space associated with a job). In certain embodiments, this may occur during periods of reduced workload so as not to overly compete with other tasks of the computing system 100. To identify control blocks 202, the control block identification module 304 may be configured scan the storage areas identified by the storage monitoring module 300 and look for "eyecatchers" or other identifiers that indicate the presence of a control block 202.

Once a control block 202 is identified, the control block validation module 306 may analyze the control block 202 to determine if it contains valid data or, conversely, contains an error or defect. The control block validation module 306 may at least partly accomplish this by comparing various fields and characteristics of the control block 202 with those stored in the validation table 206 previously discussed. For a given type of control block 202, the validation table 206 may specify characteristics such as a name and usage of a control block 202, fields that are required and/or optional in a control block 202, field values and/or ranges of values, field lengths, control block length, and the like. Any or all of these characteristics may be used to determine whether a control block 202 is valid or invalid.

In certain embodiments, the validation table 206 may indicate how to determine whether a control block 202 is active or inactive. If a control block 202 is inactive, the control block validation module 306 may skip over the control block 202 or perform minimal validation thereon. Similarly, the validation table 206 may, in certain embodiments, indicate which fields of a control block 202 contain references (e.g., pointers) to other control blocks 202. In certain embodiments, the control block validation module 306 may validate not only a control block 202 and its references (to ensure the control block 202 points to valid data or control blocks 202), but also some or all control blocks 202 to which the control block 202 refers. In other cases, the validation table 206 may indicate whether a control block 202 is part of a chain of control blocks 202 and/or whether to validate the chain. The control block validation module 306 may, in certain embodiments, be configured to validate some or all control blocks 202 in the chain if indicated in the validation table 206. In yet other embodiments, the validation table 206 may indicate whether a control block 202 is a header control block 202 or sub control block 202. If a control block 202 is a header control block 202, the control block validation module 306 may validate the header control block 202 in addition to its sub control blocks 202. Likewise, if a control block 202 is a sub control block 202, the control block validation module 306 may validate its header control block 202 and possibly sibling control blocks 202.

When an error or defect is detected in a control block 202, the messaging module 308 may generate a message to notify appropriate systems and/or personnel of the error or defect so that remedial actions may be taken. In certain embodiments, the message may indicate the date and time the control block 202 was previously determined to be valid, as indicated in the log data 208. This information may be helpful to determine how and when a control block 202 became invalid.

If the content of a control block is determined to be valid, the log module 310 may log (in the log data 208) information such as the name, identifier, and address of the control block 202, and the time and date that the control block 202 was validated. Similarly, if the content of a control block 202 fails the validation, meaning that the control block 202 may contain an error or defect, the log module 310 may also record the name, identifier, and address of the control block 202, and the date and time that the control block 202 failed the validation. In addition, in certain embodiments the log module 310 may provide a detailed description of the parts (e.g., fields, etc.) of the control block 202 that failed the validation. This information may be helpful to determine the history of a control block 202 and/or diagnose what caused an error or defect in the control block 202, as well as the timing of the events that caused such.

When a control block 202 is damaged or overlaid with other data, it can difficult to determine when the control block 202 was built and when it was last valid. The log module 310 and associated log data 208 can help answer such questions. For example, storage overlays that are random (e.g., control block A is overlaid today, control block B was overlaid yesterday) often have the same value overlay the control blocks 202. The detailed description generated by the log module 310 and stored in the log data 208 may help to associate the overlays and determine what is causing them.

Figure 4:
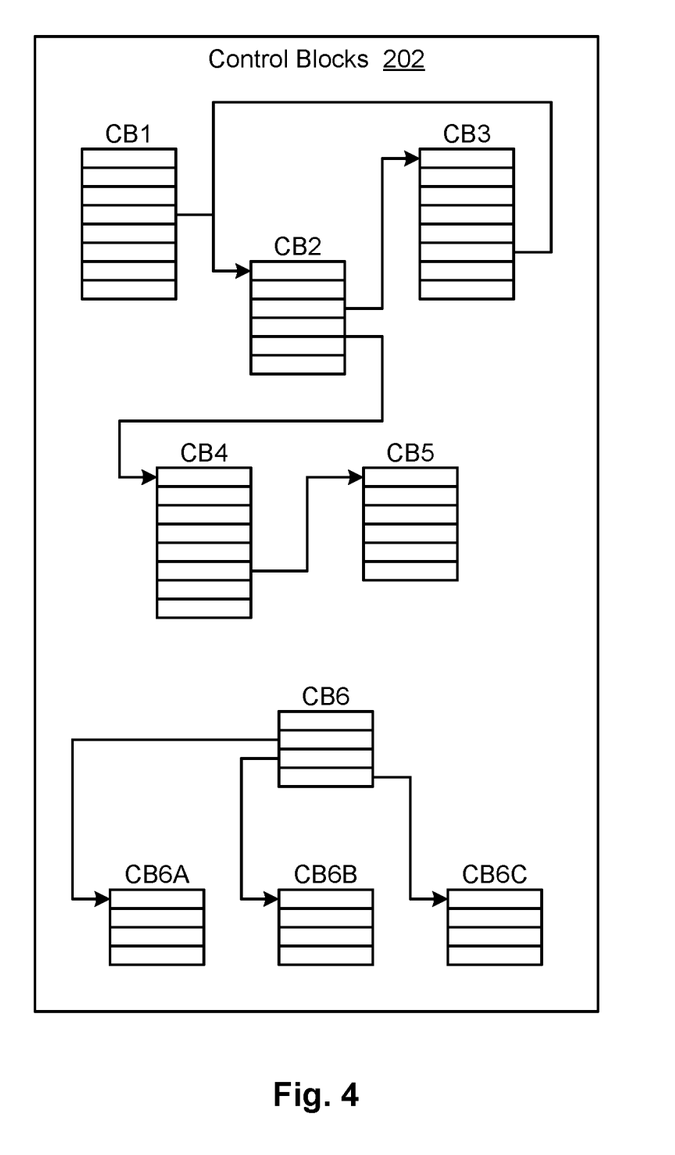
FIG. 4 is a high-level block diagram showing various possible relationships between control blocks.

Referring to FIG. 4, as indicated above, when validating a particular control block 202, the control block validation module 306 may be configured to also validate control blocks 202 that are referenced by the particular control block 202, or validate control blocks 202 that reside in the same chain as the particular control block 202. FIG. 4 shows a set of control blocks 202 (i.e., CB1, CB2, CB3, CB4, and CB5) that are chained together by references to one another. FIG. 4 also shows a set of control blocks 202 comprising a header control block 202 (CB6) that references several sub control blocks 202 (CB6A, CB6B, and CB6C). When validating a header control block 202, the control block validation module 306 may also validate the sub control blocks 202, or vice versa.

Figure 5:
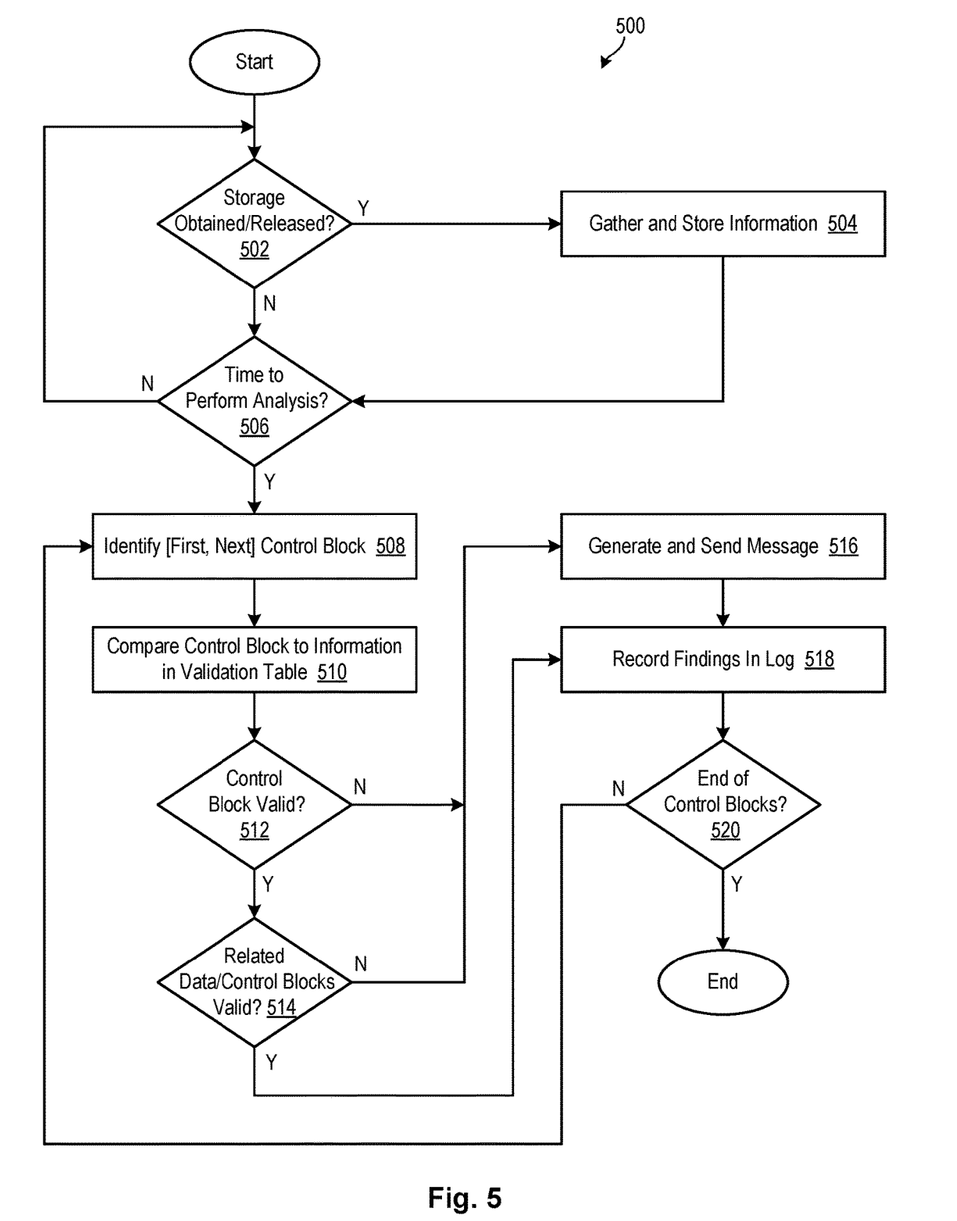
FIG. 5 is a flow diagram showing one embodiment of a method for validating control blocks in memory.

Referring to FIG. 5, one embodiment of a method 500 for validating control blocks 202 in memory 104 is illustrated. As shown, the method 500 initially determines 502 whether storage has been obtained or released from memory 104. If so, the method 500 gathers 504 and stores 504 information associated with the storage that was obtained or released. As previously mentioned, the steps 502, 504 may, in certain embodiments, operate continuously in the background to monitor when storage is obtained and released.

The method 500 further determines 506 whether it is time to analyze control blocks 202 in memory 104. If so, the method 500 identifies 508 a first control block 202 in memory 104 and compares 510 the control block 202 to information in the validation table 206. If, at step 512, the method 500 determines that the control block 202 is invalid, the method 500 generates 516 a message describing the error or defect and sends 516 the message to appropriate systems and/or personnel. In certain embodiments, the message may indicate the date and time the control block 202 was previously determined to be valid.

If, at step 512, the control block 202 is determined to be valid, the method 500 may, in certain embodiments, determine 514 whether control blocks 202 that are referenced by the control block 202 or in the same chain as the control block 202 are valid. If any of these related control blocks 202 are not valid, the method 500 generates 516 a message describing the error or defect in the related control blocks 202 and sends 516 the message to appropriate systems and/or personnel.

Regardless of whether a control block 202 is determined to be valid or invalid, the method 500 may record 518 its findings in the log data 208 previously described. The method 500 may then determine 520 whether it has analyzed the last control block 202 in the memory 104 or subset of memory 104. If not, the method 500 identifies 508 the next control block 202 in memory 104 and repeats the steps 510, 512, 514, 516, 518 previously described. If the control block 202 analyzed is the last control block 202 in memory 104 or subset of memory 104, the method 500 ends.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for validating control blocks in memory, the method comprising:
monitoring for operations configured to obtain storage space in memory;
examining the storage space that has been obtained to identify control blocks stored in the storage space;
analyzing the control blocks to determine whether the control blocks are valid;
if a control block is valid, recording a date and time when the control block was determined to be valid; and
if a control block is not valid, generating a message indicating that the control block is not valid.

2. The method of claim 1, wherein analyzing the control blocks comprises comparing content of the control blocks to information in a validation table, the information indicating at least one of possible values and ranges of values for fields in the control blocks.

3. The method of claim 1, wherein analyzing the control blocks further comprises validating other control blocks that are referenced by the control blocks.

4. The method of claim 1, wherein analyzing the control blocks further comprises validating chains of control blocks to which the control blocks belong.

5. The method of claim 1, further comprising indicating, in the message, a date and time the control block was previously determined to be valid.

6. The method of claim 1, further comprising monitoring for operations configured to release storage space from the memory.

7. The method of claim 6, further comprising ceasing to examine the storage space that has been released.

8. A computer program product for validating control blocks in memory, the computer program product comprising a computer-readable storage medium having computer-usable program code embodied therein, the computer-usable program code comprising:
computer-usable program code to monitor for operations configured to obtain storage space in memory;
computer-usable program code to examine the storage space that has been obtained to identify control blocks stored in the storage space;
computer-usable program code to analyze the control blocks to determine whether the control blocks are valid;
computer-usable program code to, if a control block is valid, record a date and time when the control block was determined to be valid; and
computer-usable program code to, if a control block is not valid, generate a message indicating that the control block is not valid.

9. The computer program product of claim 8, wherein analyzing the control blocks comprises comparing content of the control blocks to information in a validation table, the information indicating at least one of possible values and ranges of values for fields in the control blocks.

10. The computer program product of claim 8, wherein analyzing the control blocks further comprises validating other control blocks that are referenced by the control blocks.

11. The computer program product of claim 8, wherein analyzing the control blocks further comprises validating chains of control blocks to which the control blocks belong.

12. The computer program product of claim 8, further comprising computer-usable program code to indicate, in the message, a date and time the control block was previously determined to be valid.

13. The computer program product of claim 8, further comprising computer-usable program code to monitor for operations configured to release storage space from the memory.

14. The computer program product of claim 13, further comprising computer-usable program code to cease to examine the storage space that has been released.

15. A system for validating control blocks in memory, the system comprising:
at least one processor;
at least one memory device operably coupled to the at least one processor and storing instructions for execution on the at least one processor, the instructions causing the at least one processor to:
monitor for operations configured to obtain storage space in memory;
examine the storage space that has been obtained to identify control blocks stored in the storage space;
analyze the control blocks to determine whether the control blocks are valid;
if a control block is valid, record a date and time when the control block was determined to be valid; and
if a control block is not valid, generate a message indicating that the control block is not valid.

16. The system of claim 15, wherein analyzing the control blocks comprises comparing content of the control blocks to information in a validation table, the information indicating at least one of possible values and ranges of values for fields in the control blocks.

17. The system of claim 15, wherein analyzing the control blocks further comprises validating other control blocks that are referenced by the control blocks.

18. The system of claim 15, wherein analyzing the control blocks further comprises validating chains of control blocks to which the control blocks belong.

19. The system of claim 15, wherein the instructions further cause the at least one processor to indicate, in the message, a date and time the control block was previously determined to be valid.

20. The system of claim 15, wherein the instructions further cause the at least one processor to monitor for operations configured to release storage space from the memory, and cease to examine the storage space that has been released.

* * * * *